United States Patent [19]
Goto

[11] Patent Number: 5,737,684
[45] Date of Patent: Apr. 7, 1998

[54] DAMA TYPE SATELLITE COMMUNICATION SYSTEM USING NON-OVERLAPPED MULTI-SPOT BEAM

[75] Inventor: Yuji Goto, Tokyo, Japan

[73] Assignee: NEC Corporation, Tokyo, Japan

[21] Appl. No.: 420,609

[22] Filed: Apr. 12, 1995

[30] Foreign Application Priority Data

Apr. 12, 1994 [JP] Japan ................................ 6-099223

[51] Int. Cl.$^6$ .................................................... H04B 7/15
[52] U.S. Cl. ...................... 455/12.1; 455/13.2; 455/430; 370/315
[58] Field of Search ..................... 455/12.1, 13.2, 455/430, 424, 450; 370/75, 57, 315, 316

[56] References Cited

U.S. PATENT DOCUMENTS

| | | | |
|---|---|---|---|
| 4,813,036 | 3/1989 | Whitehead | 370/57 |
| 4,901,307 | 2/1990 | Gilhousen et al. | 370/18 |
| 4,951,279 | 8/1990 | Hotta | 370/75 |

FOREIGN PATENT DOCUMENTS

| | | | |
|---|---|---|---|
| 0324363 | 7/1989 | European Pat. Off. | H04B 7/185 |
| 64-30338 | 2/1989 | Japan | |

OTHER PUBLICATIONS

Chris J. Powell et al., "Demand Assignment Multiple Access and Dynamic Channel Allocation . . . Systems", *IEEE Journal on Selected Areas in Communications*, vol. 10, No. 6, Aug. 1992, pp. 1020–1029.

M.G. Caruso et al., "A Real Time DAMA Management Processor for High . . . Systems", 3rd European Conference on Satellite Communications, Nov. 2–4, 1993, pp. 1–5.

*Primary Examiner*—Reinhard J. Eisenzopf
*Assistant Examiner*—Darnell R. Armstrong
*Attorney, Agent, or Firm*—Sughrue, Mion, Zinn, Macpeak & Seas, PLLC

[57] ABSTRACT

Even when a multi-spot beam is utilized, a demand assignment multiple access (DAMA) type satellite communication can be established between a plurality of satellite earth stations installed in one zone located opposite to another zone where a control station is installed, and between the control station and the satellite earth station installed in the same zone. The control station transmits a channel setting signal for setting a communication channel to the satellite earth stations installed in the opposite zones by using a CSC signal, and further sets a channel of a transmitting/receiving unit in such a manner that after the CSC signal derived from the satellite earth station has been received, this CSC signal is returned thereto. A repeater station has a function such that repeater station receives the CSC signal to return this CSC signal, and also receives a communication signal to return this communication signal. The satellite earth station includes a delay device for setting a time defined as after the CSC signal is received, until a response signal is transmitted, based on the received delay data.

8 Claims, 13 Drawing Sheets

DAMA TYPE SATELLITE COMMUNICATION SYSTEM USING NON-OVERLAPPED MULTI-SPOT BEAM

BACKGROUND OF THE INVENTION

1. Field of the Invention

The present invention relates to a satellite communication system employing DAMA (Demand Assignment Multiple Access), in which more than three satellite earth stations installed at two opposing points communicate by using a multi-spot beam, while utilizing more than two transmission paths.

2. Description of the Prior Art

Conventionally, the DAMA type satellite communication system is known from, for instance, Japanese Laid-open Patent Application No. 64-30338, opened in 1989, in which when more than three satellite earth stations installed at two opposing points communicate, while using more than two transmission paths, by employing the SCPC (Single Channel Per Carrier)-FDMA system. Communication channels are allocated to the respective satellite earth stations which share the communication channels, and each of these satellite earth stations performs the satellite communication by using the allocated communication channel, resulting in reduction of the communication channel number.

A satellite communication system with the system arrangement shown in FIG. 1 is a conventional example of a demand assignment multiple access (DAMA) system. In this drawing, a control station 100 and more than three satellite earth stations (E/S) $150_1$ to $150_3$ (for convenience, three satellite earth stations are shown) are installed on the ground. The control station 100 corresponds to a specific satellite earth station having the communication channel allocation function. This control station 100 is comprised of an antenna 101, an RF unit 102, a Common Signalling Channel modulator (CSC MOD) 103, a CSC demodulator (CSC DEM) 104, and a primary DAMA controller (PDC) 105. The satellite earth stations $150_1$ to $150_3$ have the same circuit arrangement, and each is comprised of an antenna 151, the outdoor unit (ODU) 152, the indoor unit (IDU) 153, and communication terminal equipment (TERM) 154. The TERM 154 transmits and receives a voice or data signal. It has a function of transmitting and receiving a signalling signal, for example, dialling, to select the required channels from the available pool channels. An example of the TERM 154 is a telephone, a facsimile or data communication equipment and so on.

In this conventional satellite communication system, one satellite earth station requesting a satellite communication among the satellite earth stations $150_1$ to $150_3$ performs the transmission by way of the CSC signal A' via the satellite (not shown) to the control station (CONT E/S) 100. The control station 100 receives the CSC signal A' by the antenna 101 and then supplies this CSC signal A' via the RF unit (RF) 102 to the CSC demodulator 104 for demodulation, so that the content of this demodulated CSC signal is decoded by the PDC 105.

The control station 100 produces data having a content indicative of the SCPC channel number not used in the PDC 105, and then transmits the data as the CSC signal A through the RF unit 102, the CSC signal modulator 103, and the antenna 101. The CSC signal A sent from the control station 100 is received by the respective antennas 151 of all the satellite earth stations $150_1$ to $150_3$, so that this CSC signal A is demodulated via the outdoor unit 152 to the indoor unit 153.

When the communication channel is set by way of the CSC signal A in the satellite earth station requesting the communication, the transmission channel is set in such a manner that this transmission channel is the same as the communication channel designated by the indoor unit 153, and information that the transmission channel has been selected is then transmitted via the outdoor unit 152 and the antenna 151 to the control station 100. It should be noted that as indicated in FIG. 1, the channel of the communication signal line is set to be different from that of the CSC signal line.

This conventional satellite communication system corresponds to the single beam system such that all of the satellite earth stations $150_1$ to $150_3$ are covered by a single satellite. On the contrary, a multi-spot beam system has been recently introduced in order to satisfy demands for increasing the quantity of satellite earth stations. That is, according to the multi-spot beam satellite communication station, the satellite communication service zone is subdivided into plural service zones, and each of these service zones is covered by an antenna beam having a narrow width, so that the total number of satellite communication lines is increased and the satellite can send out a stronger radio signal than that of the single beam system. As a result, the antennas of the satellite earth station can be made compact, and the total cost per communication line 1 involving the satellite earth station can be greatly reduced.

FIG. 2 schematically represents the system arrangement of this multi-spot beam type of conventional satellite communication system. In this drawings, a control station 200, and more than three satellite earth stations $300_1$ to $300_3$ (in this case, only three stations are shown for the sake of convenience) are installed on the ground. The control station 200 corresponds to a specific satellite earth station with the above-described communication channel allocating function. This control station 200 is arranged by, as shown in FIG. 3, an antenna 201, an RF unit 202, a CSC modulator (CSC MOD) 203, a CSC demodulator (CSC DEM) 204, a PDC 205, and also a CSC signal control unit (CSC CONT) 206. The RF unit 202 is constructed of an up-converter (U/C) 2021 corresponding to the transmission frequency converter, a high power amplifier (HPA) 2022, a low noise amplifier (LNA) 2023, and a down-converter (D/C) 2024 corresponding to a reception frequency converter.

The CSC modulator 203 is arranged by the CSC modulating unit 2031 and the multiplier unit (MULTI) 2032, whereas the CSC demodulator 204 is arranged by a CSC demodulating unit 2041 and a de-multiplier unit (DE-MULTI) 2042. The PDC 205 receives the signal supplied from the de-multiplier unit 2042 and outputs the signal to the multiplier unit 2032.

The satellite earth stations $300_1$ to $300_3$ have the same arrangements, and as illustrated in FIG. 4, are constructed of the antenna 301, the outdoor unit 302, the indoor unit 303, and the communication terminal equipment (TERM) 304. The TERM 304 is a communication terminal which has the same function as the TERM 154 described in FIG. 1. The outdoor unit 302 is comprised of up-converter (U/C) 3021, high power amplifier 3022, low noise amplifier (LNA) 3023, and the down-converter (D/C) 3024. The indoor unit 303 is comprised of the CSC modulating unit 3031, the communication modulating unit (CH MOD) 3032, the combiner (COMB) 3033, the distributor 3034, the communication demodulating unit (CH DEM) 3035, the CSC demodulating unit 3036, the SDC (secondary DAMA controller) 3037, and the control unit 3038.

Since this conventional system corresponds to the multi-spot beam system, as indicated in FIG. 2, a single antenna beam may cover either the zone "X" where the control station 200 and the satellite earth station 300₁ are installed, or the zone "Y" where the satellite earth stations 300₂ and 300₃ are installed.

As a consequence, in the event that either the satellite earth station 300₂ or 300₃ in the zone Y establishes communication with either the control station 200, or the satellite earth station 300₁, and either the satellite communication station 300₂ or 300₃ transmits the CSC signal A2 (CSCI) via the satellite to the control station 200, the control station 200 receives this CSC signal A2 (CSCI) via the antenna 201, the LNA 2023, and the D/C 2024 and demodulates the signal in the CSC demodulating unit (CSC DEM) 2041. Then, this demodulated signal is entered via the de-multiplier unit 2924 to the PDC 205.

Then, the PDC 205 produces the information for designating the communication frequency not in use among a plurality of communication frequencies, and transmits the CSC signal A1 (CSCO) from the antenna 201 via the multiplier 2032, the CSC modulating unit 2031, the U/C 2021, and the HPA 2022 to the satellite earth station 300₂ or 300₃. Either the satellite earth station 300₂ or 300₃ receives the CSC signal A1 which has been sent from the control station 200 via the satellite, through the antenna 301, the LNA 3023, the D/C 3024, and the distributor 3034, by the CSC demodulating unit (CSC DEM) 3036. Then, the CSC demodulating unit 3036 supplies the demodulated information to the SDC 3037.

As a result, the SDC 3037 controls the frequencies of the communication modulating unit (COM MOD) 3032 and the communication demodulating unit 3035 via the control unit (CONT) 3038 in such a manner that the frequency is the same as the communication frequency designated by the control station 200, and transmits such information that the channel has been selected to the control station 200 via the CSC modulating unit (CSC MOD) 3031, the combiner (COMB) 3033, the U/C 3021, the HPA 3032 and the antenna 301. Thereafter, the SDC 3037 performs the communication by the communication terminal equipment (TERM) 304. During the communication, the communication modulating unit 3032 and the communication demodulating unit 3035, are utilized.

In this manner, this conventional communication system employs the CSC signal lines, through which the communication signal line allocates information between the control station 200 in response to demand, and the respective satellite earth stations 300₁ to 300₃, so that the satellite communication line can be effectively utilized.

Therefore the above-described conventional satellite communication system shown in FIG. 2 has an initial condition such that all the satellite earth stations 300₁ to 300₃ performing satellite communications can communicate via the CSC signal line with the control station 200. In this case, which the multi-spot beam is utilized as the cross beam, and operates in a non-overlapping beam topology, and has a feature that satellite communication between one zone and another zone is allowable, but return communication via satellite in the same zone is prohibited. In FIG. 2, the signal transmitted from the zone X where the control station 200 is installed can be received as the CSC signal by the satellite earth stations 300₂ and 300₃ installed in zone Y. However, since this CSC signal cannot be received by the satellite earth station 300₁ installed in the same zone where the control station 200 is installed, due to the employment of the cross beam, a problem arises that the demand assignment multiple access (DAMA) communication could not be established between the control station 200 within the zone X, and the satellite earth station 300₁ within the same zone X.

Similar to the above-described reason, although the signal transmitted from zone Y cannot be received in the zone Z in conventional satellite communication system, this signal cannot be received in the zone Y. As a result, the satellite earth stations 300₂ and 300₃ also installed in zone Y, can establish a communication signal with either the control station 200, or the satellite earth station 300₁, which are installed in zone X by using the signal transmitted from the control station 200. However, the communication signal cannot be transmitted/received between these stations located within the same zone. Therefore, another problem arises that the demand assignment multiple access communication can not be established within the same zone.

To solve this problem, a communication system is conceived such that the communication signal is transmitted to the opposite zone, and the return signal therefrom is received by another satellite earth station installed within the same zone. However, when the communication is established by using this return signal, or not using this return signal, there is a great delay time between them. There is a further problem regarding the CSC signal being received due to this delay time difference.

The present invention has been made to solve the above-described problems, and therefore has the objective of providing a satellite communication system capable of performing the demand assignment multiple access satellite communication system among a plurality of satellite earth stations installed in a zone located opposite to another zone where a control station is installed, even when using a multi-spot beam.

Another objective of the present invention is to provide a satellite communication system capable of performing the demand assignment multiple access satellite communication system between a satellite earth station and a control station, which are installed in the same zone, even when using a multi-spot beam.

SUMMARY OF THE INVENTION

To achieve the above-described objectives, a demand assignment multiple access type satellite communication system according to the present invention is provided in which a communication channel is allocated by a control station, comprising a means for transmitting/receiving a CSC signal used to monitor/control the entire communication system in response to a call request issued from an arbitrary satellite earth station among more than 3 satellite earth stations, and a communication signal is established via a satellite using a multi-spot beam. The control station is comprised of a transmitting means and a channel setting means. When a call request for communicating between first and second satellites in a second zone opposite to a first zone where the control station is installed among plural zones covered by each beam of the multi-spot beam, the control station signalled is the CSC signal, and the transmitting means transmits a channel setting signal for setting a communication frequency to each of the first and second satellite communication stations using the CSC signal. The channel setting means sets the channel of the transmitting/receiving unit after the communication signals from the first and second satellite earth stations have been received, and returns the communication signals during the transmission of the channel setting signal.

The control station, according to the present invention, is comprised of a delay time measuring means, and a delay data transmitting means. The delay time measuring means transmits the CSC signal to the satellite earth stations installed in the second zone, which is opposite to the first zone and where the control station is installed among a plurality of zones covered by each beam of the multi-spot beam. The control station receives a response signal from the satellite earth station, so that a response signal delay time is measured. Based on the measurement result of the delay time, the delay data transmitting means transmits the delay data for delaying a time defined, as after the CSC signal is received from the satellite earth station until the response signal is transmitted. The satellite earth Station includes a delay device for setting a time defined beam after the CSC signal is received until the response signal is transmitted, based on the received delay data. In the second zone, a repeater is installed which has the function of receiving the CSC signal and returning this CSC signal, and also for receiving the communication signal and returning this communication signal.

In accordance with the present invention, when the call request for establishing communication between the first and second satellite earth stations installed in the second zone, is signalled to the control station by using the CSC signal, the control station transmits the channel setting signal for setting the communication channels to the first and second satellite earth stations by using the CSC signal. The control station returns the communication channel for the station after the communication signals derived from the first and second satellite earth stations have been received. As a consequence, the communication signals from the first and second satellite earth stations are transmitted via the control station from one station to the other station, and then are received.

Also, according to the present invention, the satellite earth station receives and demodulates the delay data transmitted from the control station by using the CSC signal, and then sets to the delay device based on this delay data, a time defined from after the CSC signal is received until the response signal is transmitted. Accordingly, the delay times in the response signals sent between the control station and a plurality of satellite earth stations are identical to each other. Also, the CSC signal can be transmitted/received via the repeater station between the control station and the satellite earth station located in the first zone where the control station is installed.

DETAILED DESCRIPTION OF THE PREFERRED EMBODIMENTS

Figure 1A:
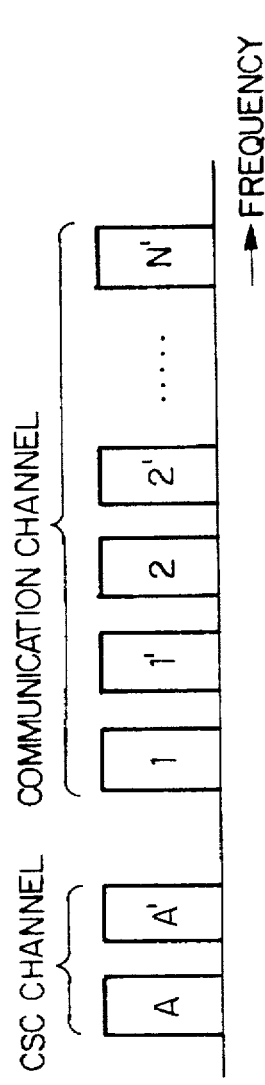
FIG. 1 schematically shows the system arrangement of one example of the conventional communication system.
Figure 1B:
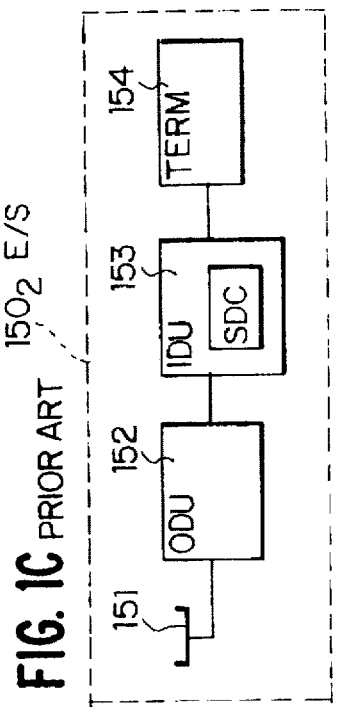
Figure 1D:
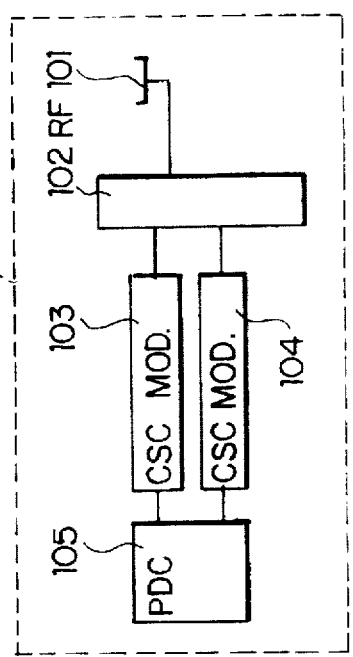
Figure 1C:
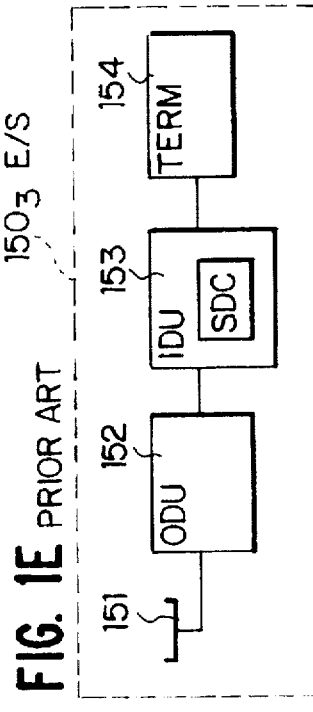
Figure 1E:
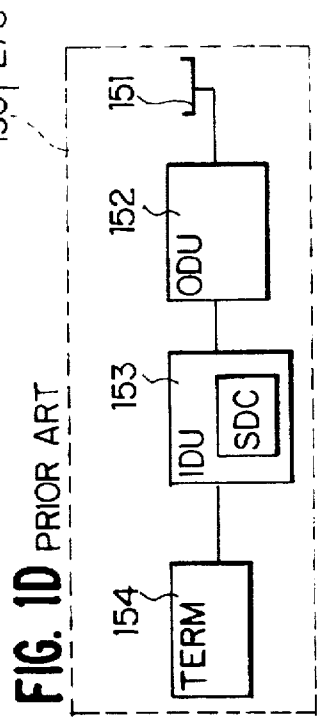
Figure 2B:
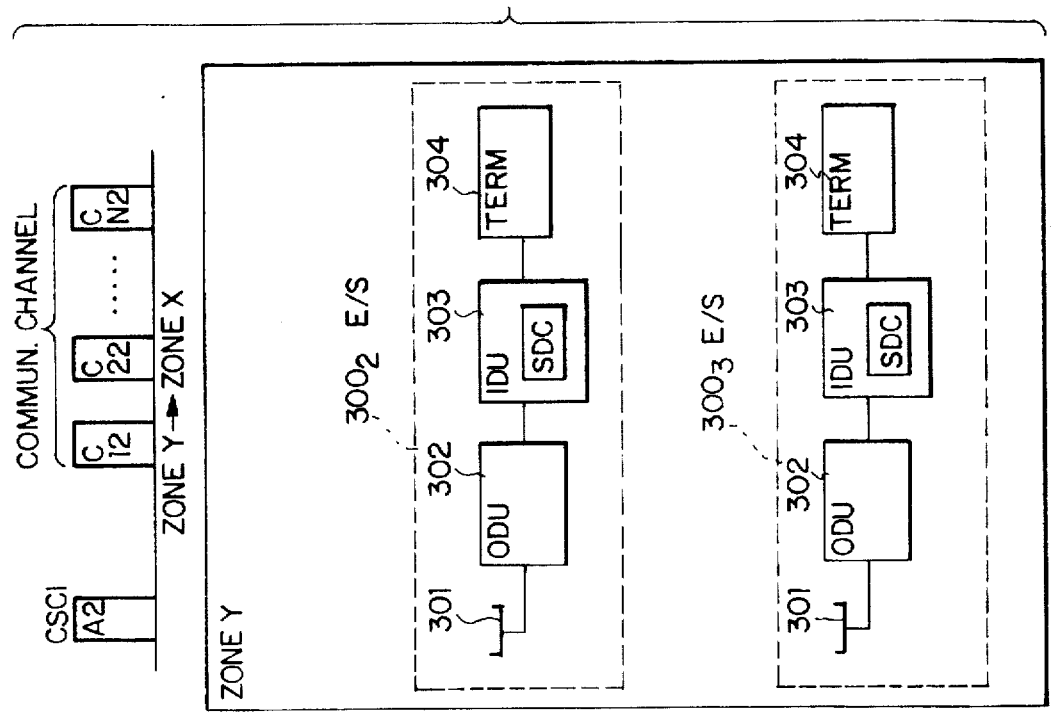
FIG. 2 schematically indicates the system arrangement of another example of the conventional communication system.
Figure 2A:
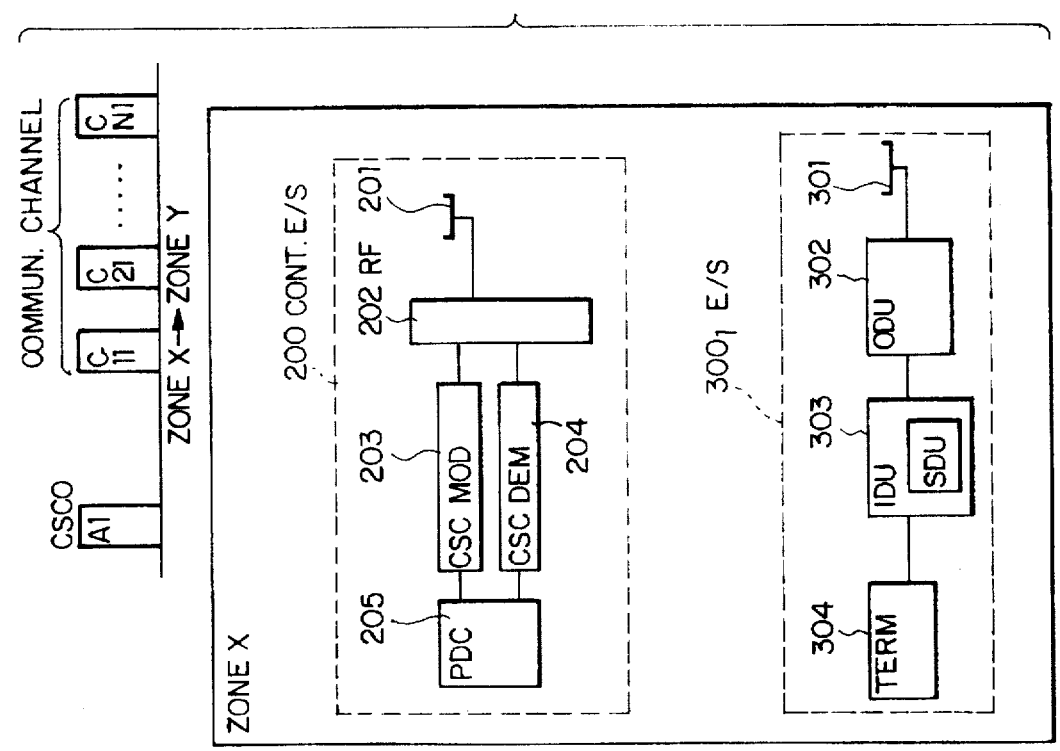
Figure 3:
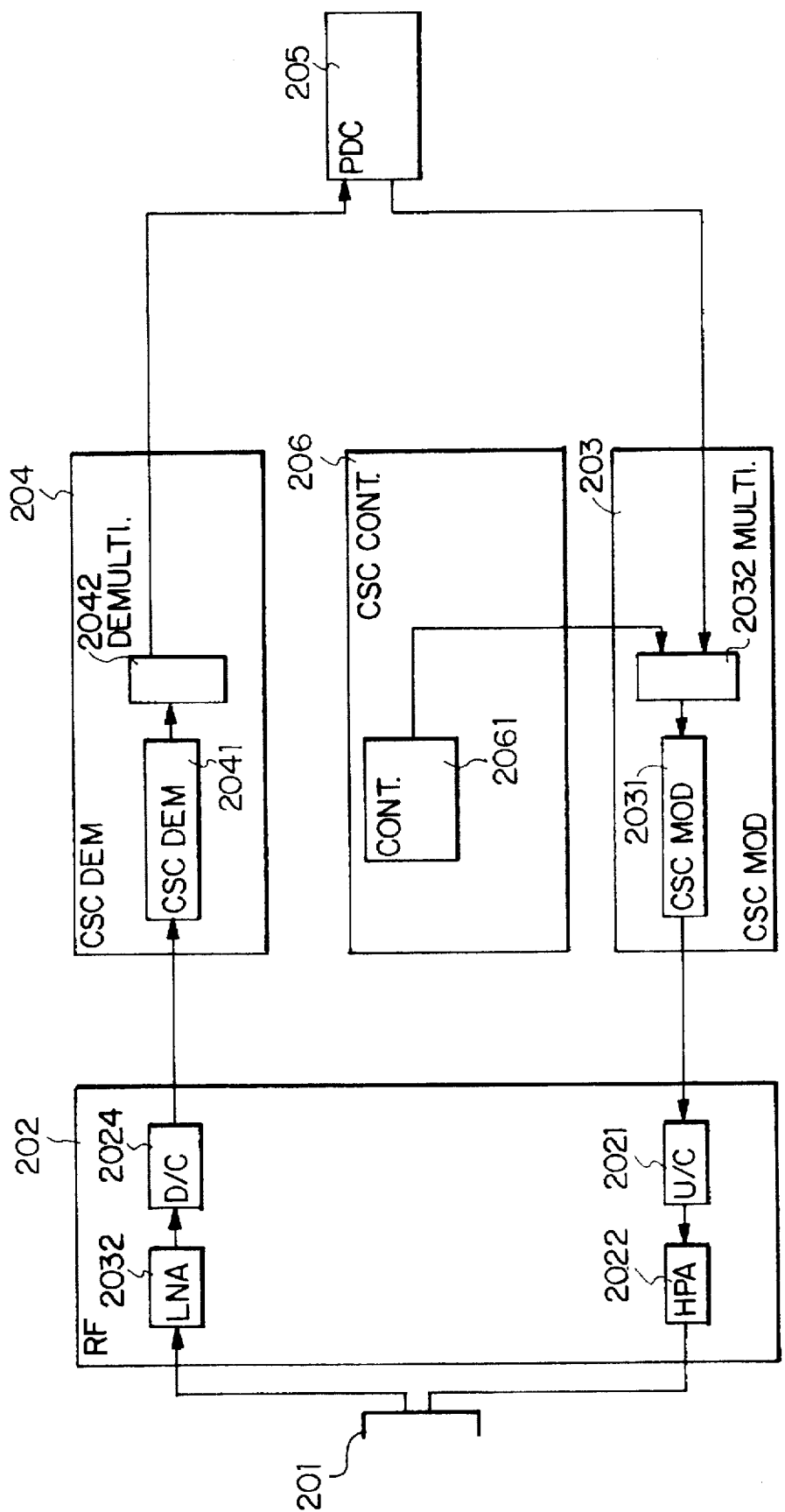
FIG. 3 is a schematic diagram for showing one example of the control station employed in the conventional communication system.
Figure 4:
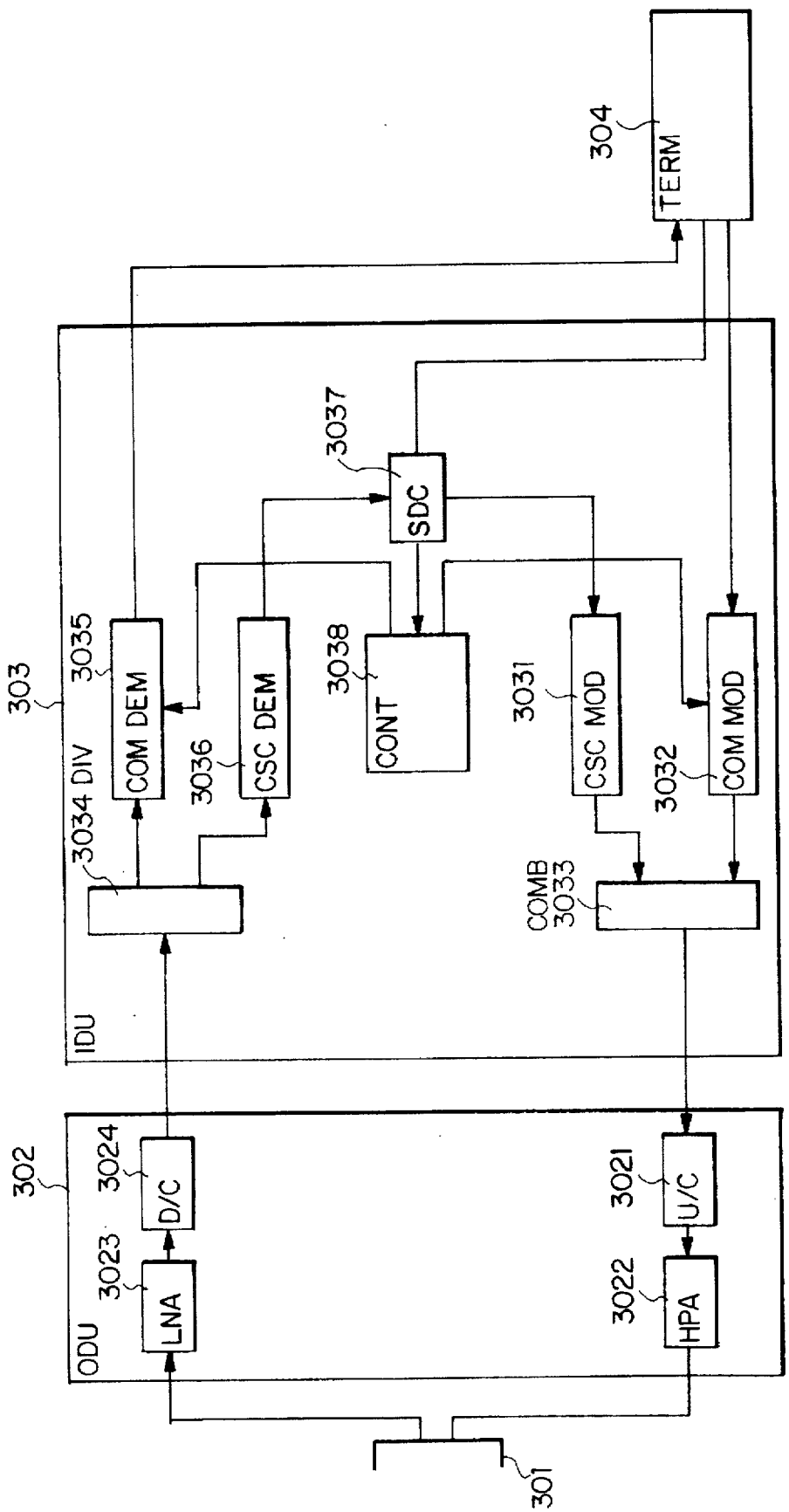
FIG. 4 is a schematic diagram for indicating one example of the satellite earth station employed in the conventional communication system.

Referring now to the drawings, a satellite communication system according to a preferred embodiment of the present invention will be described.

Figure 5B:
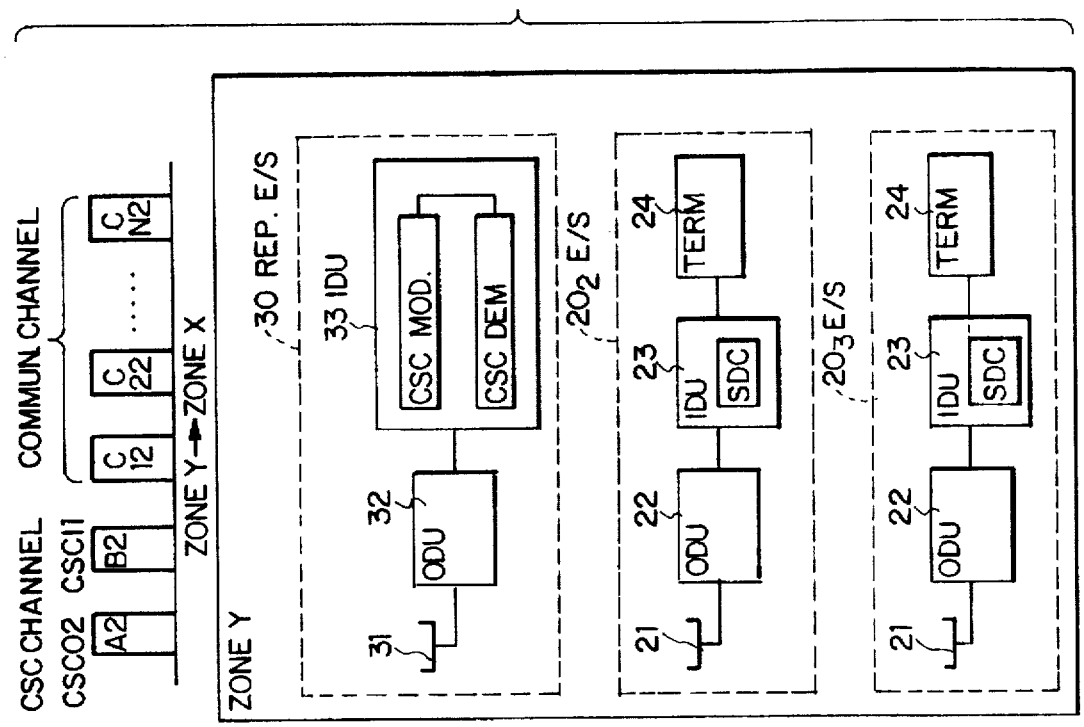
FIG. 5 schematically represents a system arrangement of a satellite communication system according to an embodiment of the present invention.
Figure 5A:
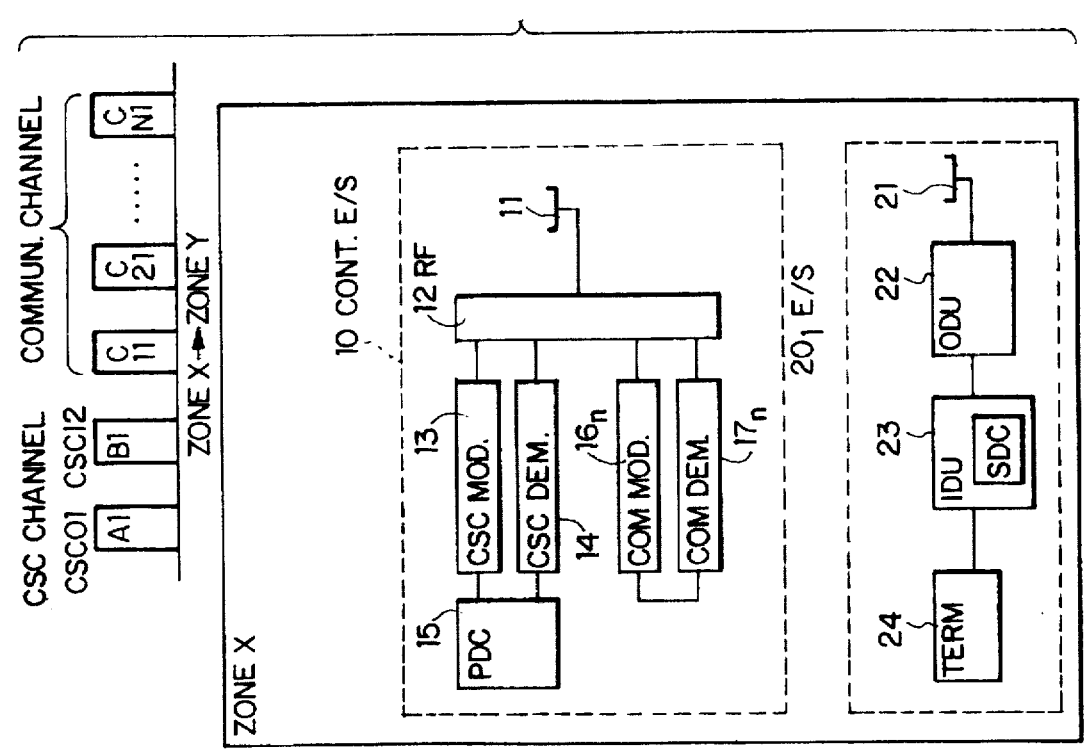

First, FIG. 5 schematically shows an overall system arrangement of a satellite communication system according to an embodiment of the present invention.

Figure 6:
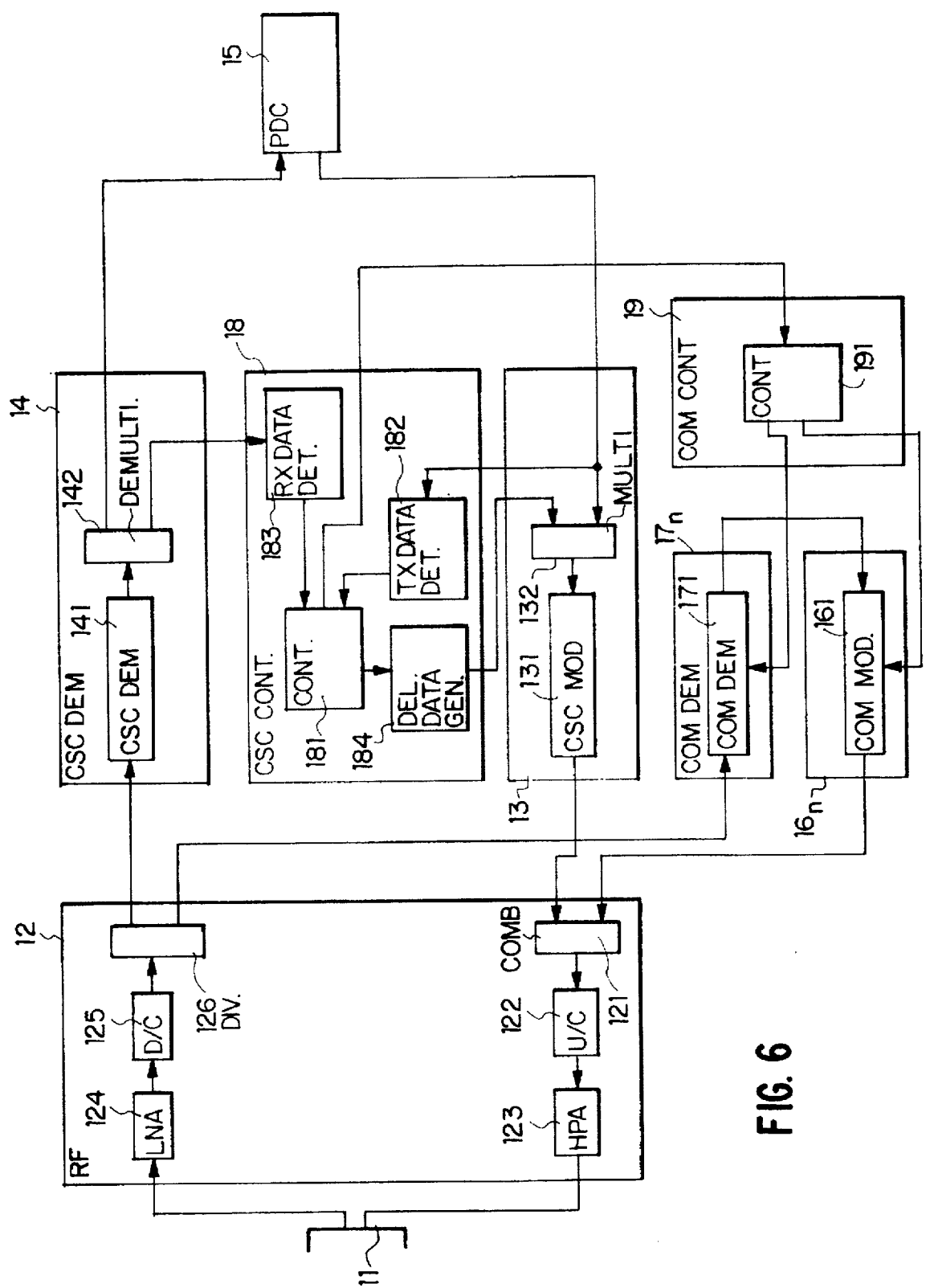
FIG. 6 is a schematic block diagram for indicating an internal arrangement of the control station employed in the communication system of FIG. 5.

FIG. 6 schematically indicates an internal arrangement of the control station, as one embodiment, employed in the communication system of FIG. 5.

Figure 7:
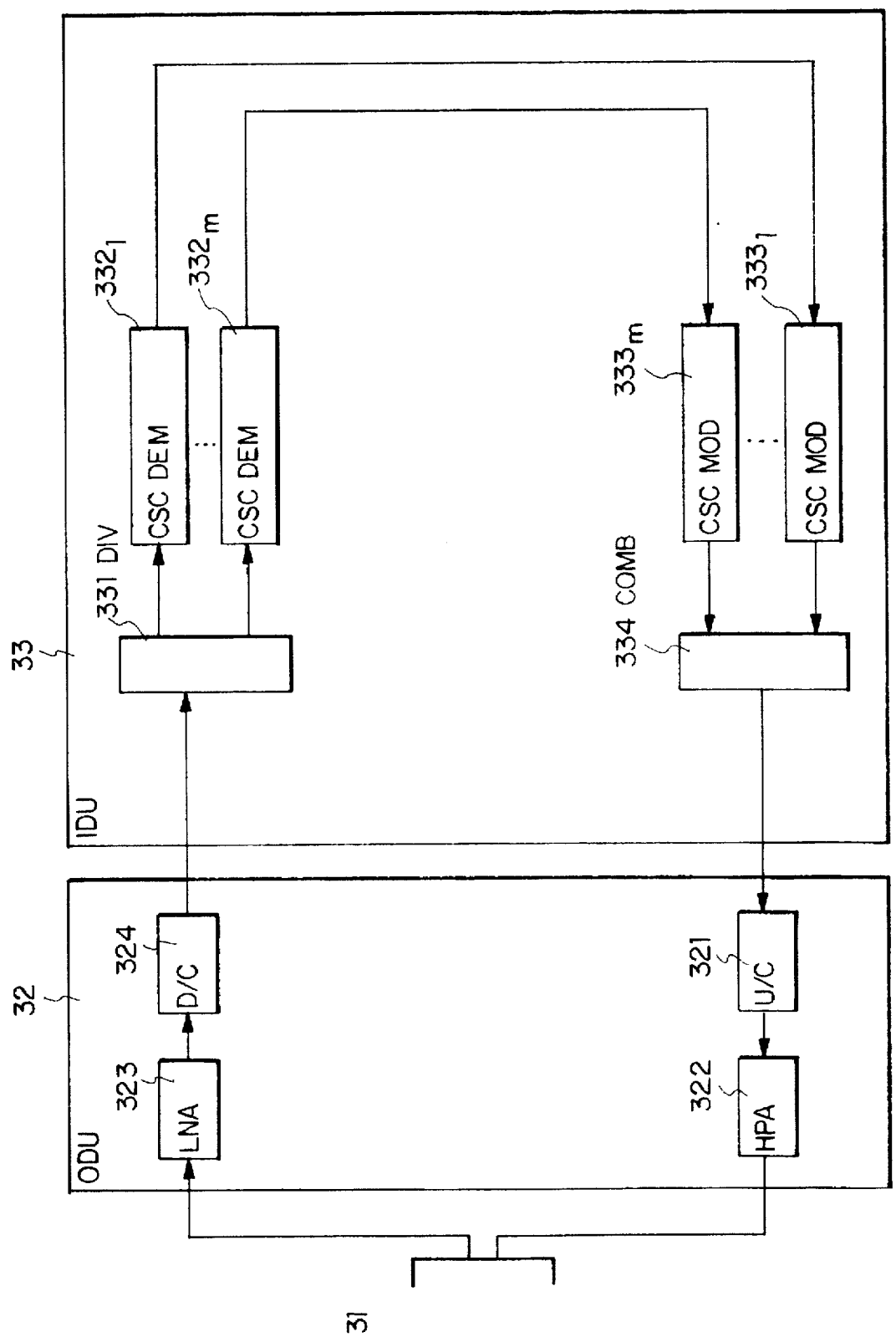
FIG. 7 is a schematic block diagram for representing an internal arrangement of the repeater station shown in FIG. 5.

FIG. 7 schematically represents an internal arrangement of the repeater station, as one embodiment, employed in the communication system of FIG. 5.

Figure 8:
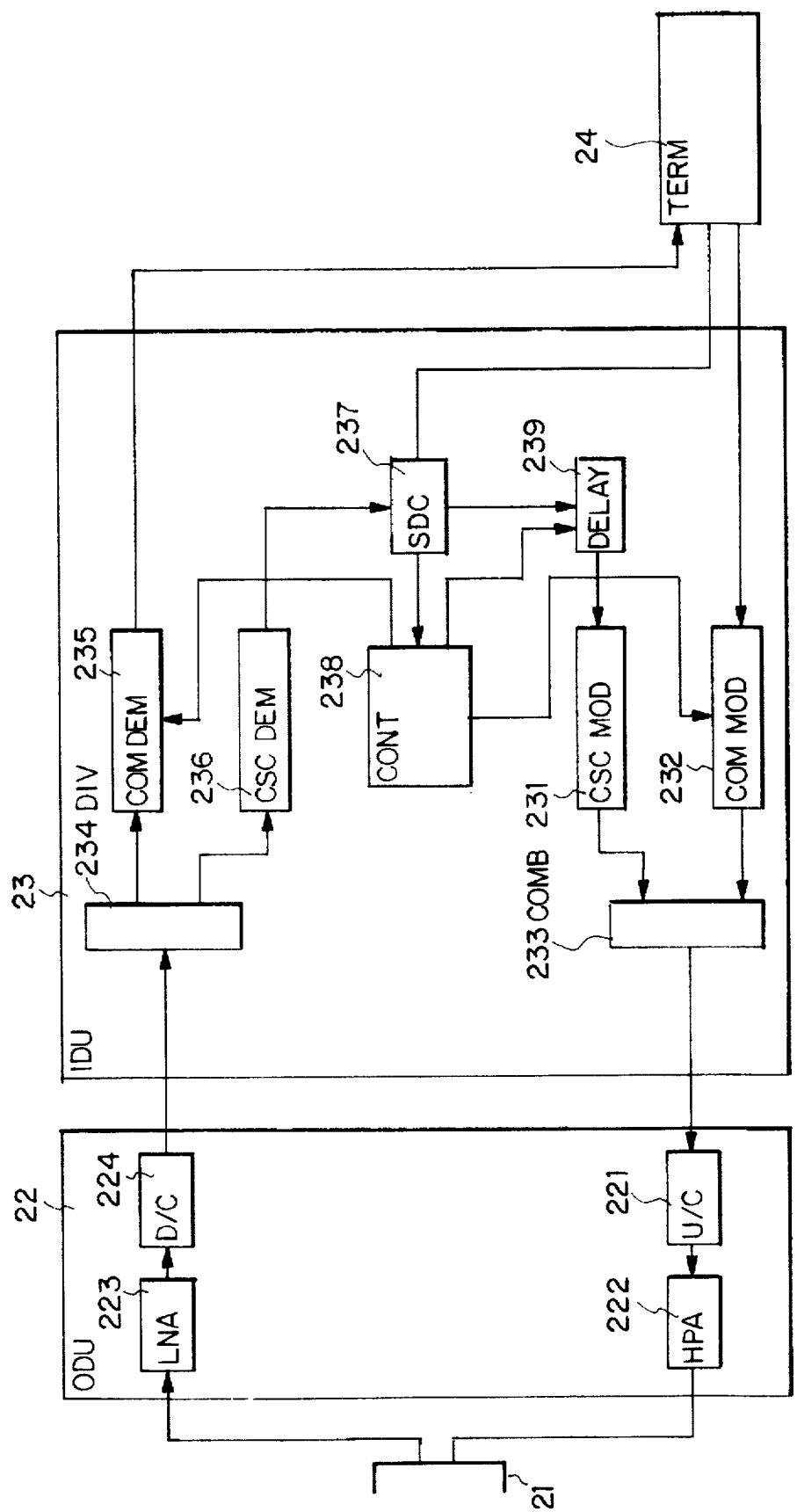
FIG. 8 is a schematic block diagram for indicating an internal arrangement of the satellite earth station shown in FIG. 5.
Figure 9:
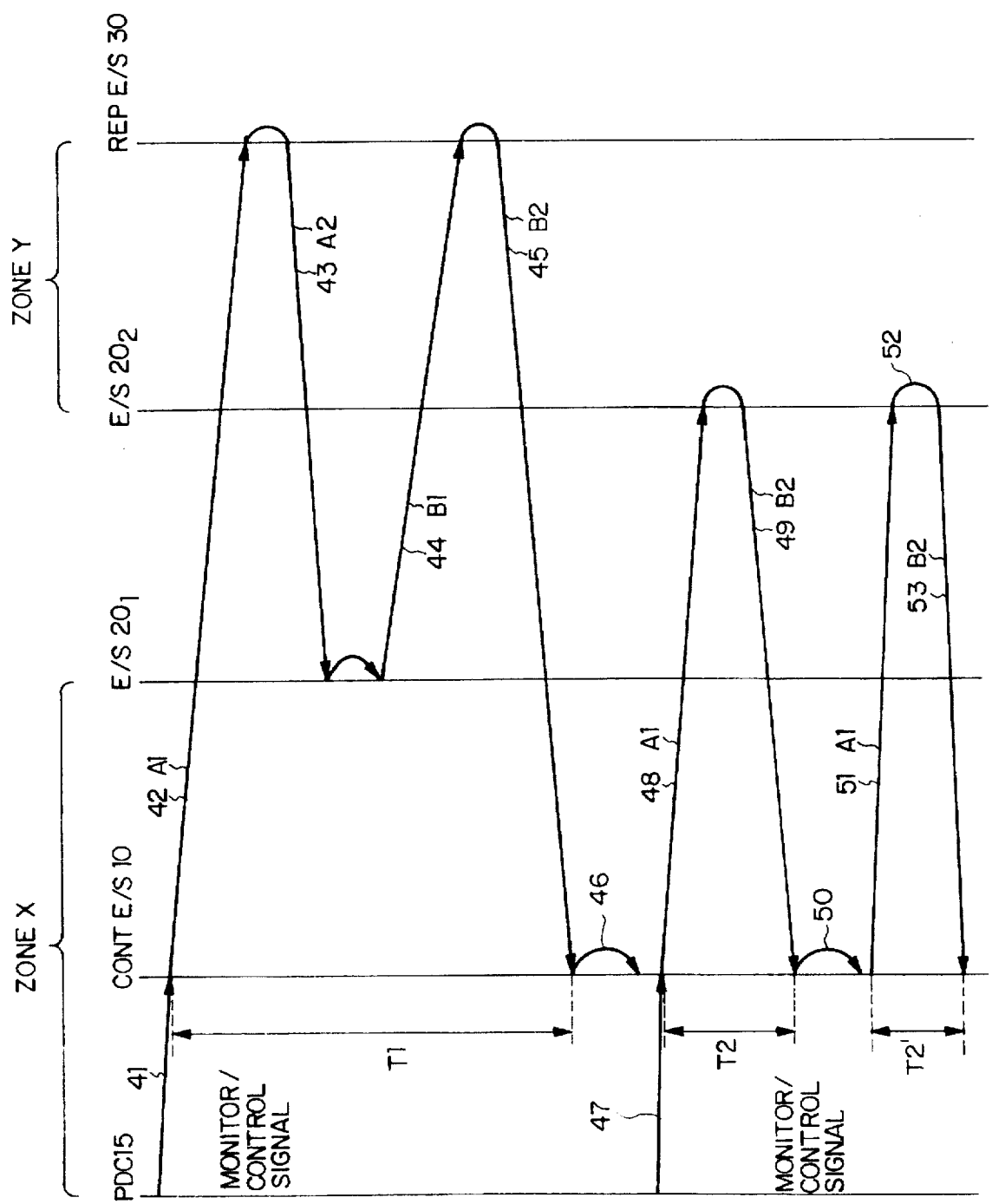
FIG. 9 shows a sequence diagram during the initial setting operation of the communication system indicated in FIG. 5.
Figure 10:
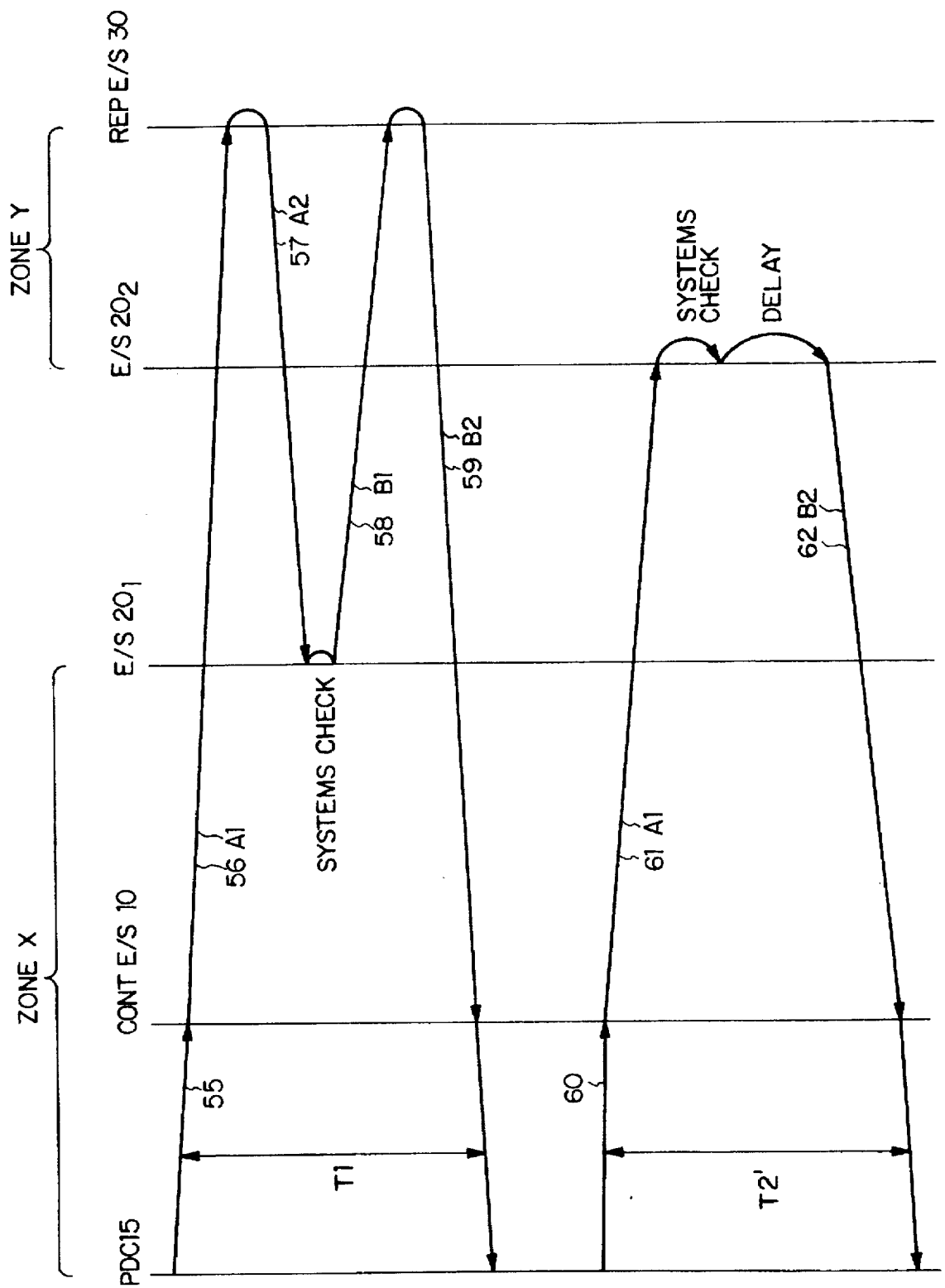
FIG. 10 denotes a sequence diagram during the system checking operation of the communication system indicated in FIG. 5.
Figure 11:
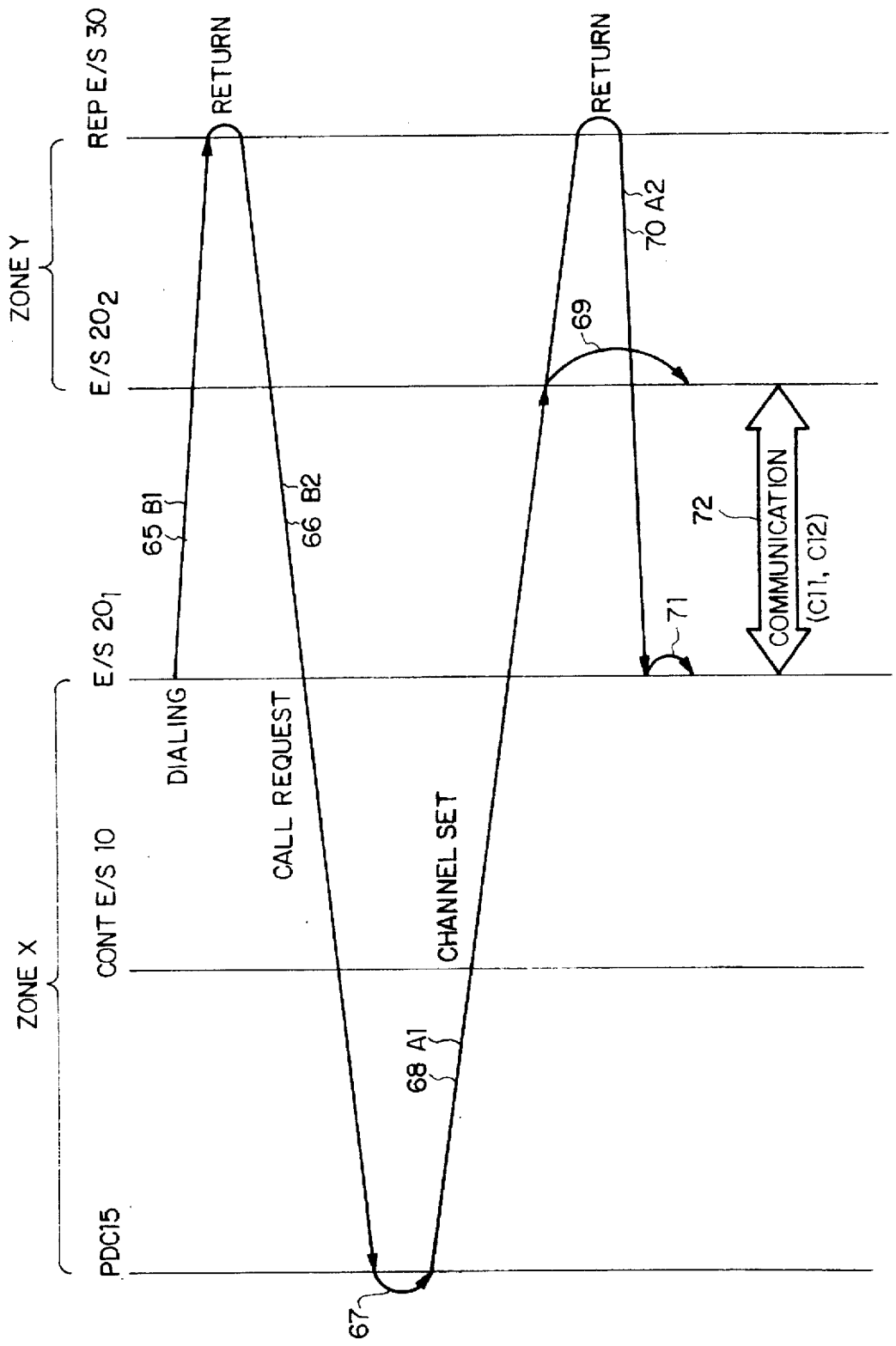
FIG. 11 indicates a sequence diagram when a communication is established between the satellite earth stations installed in different zones in the communication system of FIG. 5.

FIG. 8 schematically denotes an internal arrangement of the satellite earth station, as one embodiment, employed in the communication system of FIG. 5.

As illustrated in FIG. 5, in the satellite communication system according to this embodiment, there are installed on the ground, a control station (CONT E/S) 10, more than three satellite earth stations (E/S) (in this case, only three satellite earth stations are employed for the sake of convenience) $20_1$ to $20_3$, and a repeater station (REP E/S) 30. The control station 10 corresponds to a specific satellite earth station with the above-described communication channel allocating function. As illustrated in FIGS. 5 and 6, this control station 10 is arranged by an antenna 11, an RF unit 23, a common signal channel modulator (CSC MOD) 13, a CSC demodulator (CSC DEM) 14, a PDC 15, a communication signal modulating unit (COM MOD) $16_n$, a communication signal demodulating unit (COM DEM) $17_n$, a CSC controlling unit (CSC CONT) 18, and a communication signal controlling unit (COM CONT) 19. It should be understood that although a plurality of communication signal modulating units $16_n$ and a plurality of communication signal demodulating units $17_n$ are provided in the actual satellite communication system, only the n-th communication signal modulating unit $16_n$ and the n-th communication signal demodulating unit $17_n$ are illustrated for the sake of easy illustration.

The RF unit 12 is a unit for performing high frequency (RF) amplification and frequency conversion, and is constituted by a combiner (COMB) 121, an up-converter (U/C) 122 corresponding to a transmission frequency converter, a high power amplifier (HPA) 123, a low noise amplifier (LNA) 124, a down-converter (D/C) 125 corresponding to a reception frequency converter, and a distributor (DIV) 126.

The CSC modulator (CSC MOD) 13 is arranged by a CSC modulating unit (CSC MOD) 131 and a multiplier (MULTI) 132, whereas the CSC demodulator (CSC DEM) 14 is arranged by a CSC demodulating unit (CSC DEM) 141 and a de-multiplier (DE-MULTI) 142. The PDC 15 receives the signal supplied from the multiplier 142, and outputs the signal to the multiplier 132. The communication signal modulating unit (COM MOD) $16_n$, the communication signal demodulating unit (COM DEM) $17_n$, and the communication signal controlling unit (COM CONT) 19 has a communication signal modulating unit 161, a communication signal demodulating unit 171, and a controlling unit 191.

The CSC controlling unit 18 is comprised of a controlling unit (CONT) 181, a transmission data detecting unit 182 to which the signal from the PDC 15 is inputted, a reception data detecting unit (RX DATA DET) 183 into which the output signal from the demultiplier 142 is inputted, and a delayed data generating unit (DELAYED DATA GEN) 184 for generating delayed data based on the signal inputted from the controlling unit 181 to supply the delayed data to the multiplier 132.

The repeater station 30 corresponds to an earth station installed in zone Y in order that the CSC signal transmitted from the control station 10 can be received by the satellite earth station installed in the same zone X as that of the control station 10. As shown in FIGS. 5 and 7, the repeater station 30 is constructed of an antenna 31, an outdoor unit 32, and an indoor unit 33. The outdoor unit 32 is comprised of an U/C 321, an HPA 322, an LNA 323, and a D/C 324. The indoor unit 33 is comprised of a distributor 331, m (plural) pieces of CSC demodulating units $332_1$ to $332_m$, m pieces of CSC modulating units $333_1$ to $333_m$, and a combiner 324.

Furthermore, as shown in FIGS. 5 and 8, the satellite earth stations $20_1$ to $20_3$ have the same arrangements as each other, and each of these satellite earth stations is comprised of an antenna 21, an outdoor unit 22, an indoor unit 23, and a communication terminal equipment (TERM) 24. The TERM 24 has a function which transmits and receives a signalling signal, for example a dialling signal, to select the channels from the available pool channels. The outdoor unit 22 has the same arrangement as that of the outdoor unit 32 of the above-described repeater station 30, and that of the conventional satellite earth station, and is comprised of a U/C 221, an HPA 222, an LNA 223 and a D/C 224.

The indoor unit 23 has a feature that uses a variable delay time device 239, as compared with the indoor unit 303 of the conventional satellite earth station. That is, this indoor unit 23 is arranged by a CSC modulating unit 231, a communication modulating unit 232, a combiner 233, a distributor 234, a communication demodulating unit 235, a CSC demodulating unit 236, a CSC controlling unit (SDC) 237, and a controlling unit (CONT) 238. This arrangement is similar to that of the indoor unit 303 of the conventional satellite earth station. However, according to this embodiment, the indoor unit 303 further includes a delay device 239 to which the signals are supplied from the SDC 237 and the controlling unit 238, and which supplies a delay signal to the CSC modulating unit 231.

Since the communication system with the above-described arrangement according to the present embodiment is a multi-spot beam system, a cross beam is so constituted that as shown in FIG. 5, a single antenna beam may cover one of zone X where the control station 10 and the satellite earth station $20_1$ are located, and zone Y where the satellite earth stations $20_2$ and $20_3$, and the repeater station 30 are located.

Next, operations of the satellite communication system according to this embodiment are described with reference to the sequence diagrams in FIGS. 9 to 13. It should be noted that these sequence diagrams represent transmissions/receptions of control signals between the PDC 15 of the control station 10 and the apparatus portions of the control station 10, and between the repeater station 30 and the satellite earth stations $20_1$, $20_2$ functioning as the typical satellite earth stations installed in the different zones X and Y among the satellite earth stations $20_1$ to $20_3$.

In accordance with this embodiment, such an initial setting operation for setting the delay times to the delay devices 239 employed in the satellite earth stations $20_1$ to $20_3$ prior to the actual operation, a systems checking operation is periodically performed in order that the condition information of the respective satellite earth stations $20_1$ to $20_3$ is acquired by the control station 10, and the operation for instituting the communication signal is sequentially executed. A description follows of the initial setting operation, with reference to FIG. 9.

(1). Initial Setting Operation

First, the PDC 15 of the control station 10 sends a monitor/control signal to the satellite earth station $20_1$ located within the same zone X before the actual operation is carried out, and the PDC 15 supplies the monitor/control signal to a transmission data detecting unit 182 employed in the control station 10 (step 41). Upon input of a detection signal for the monitor/control signal supplied from the transmission data detecting unit 182, the controlling unit 181 controls the delayed data generating unit 184 to generate delayed data having no delay time, and then transmits this delayed data as a CSC signal A1 (CSC01) via the multiplier 132, the CSC modulating unit 131, the combiner 121, the U/C 122, and the HPA 123 from the antenna 11 (step 42).

The CSC signal A1 transmitted from the control station 10 is received through the satellite by the satellite earth stations $20_2$ and $20_3$ (will be referred to as "$20_2$" hereinafter) and the repeater station 30, installed in zone Y located opposite to zone X where this control station 10 is installed. The repeater station 30 converts the received signal into another CSC signal A2 (CSC02) by the indoor unit 33 through the outdoor unit 32. This CSC signal A2 is again transmitted via the outdoor unit 32 from the antenna 31 (step 43).

The CSC signal A2 transmitted from the repeater station 30 is received through the satellite by the satellite earth station $20_1$ installed in zone X located opposite to the zone Y, and is supplied via the outdoor unit 22 and the distributor 234 within the indoor unit 23, to the CSC demodulating unit 236. After this, CSC signal A2 is demodulated by the CSC demodulating unit 236, and the demodulated CSC signal is supplied to the SDC 237 so as to confirm the data. Upon reception of the confirmation result such that the delayed data having no delay is confirmed by this SDC 237, the controlling unit 238 sets the delay time of the delay device 239 to zero. The satellite earth station $20_1$ transmits the output data of the internal SDC 237 as another CSC signal B1 (CSC I2) through this delay device 239, the CSC modulating unit 231, the combiner 233, the U/C 221, and the HPA 222 from the antenna 21 (step 44).

This CSC signal B1 transmitted from the satellite earth station $20_1$ is received via the satellite by the repeater station 30 provided within zone Y, is converted into another CSC signal B2 (CSCI1), and thereafter this CSC signal B2 is again transmitted (step 45). The CSC signal B2 transmitted from the repeater station 30 is received via the satellite by the control station 10 installed in the zone X opposite to the zone Y, and then is received by the 25 reception data detecting unit 183 through the BNA 124, the D/C 125, the distributor 126, the CSC demodulating unit 141, and the de-multiplier 142, respectively. The controlling unit 181 measures a time duration (T1) after the control station 10 has transmitted the CSC signal A1 until the responding CSC signal B2 corresponding to this CSC signal A1 is received, based on respective data derived from the transmission data detecting unit 182 and the reception data detecting unit 183. Then, the measured time duration is stored in a memory employed in the controlling unit 181 (step 46).

Next, the PDC 15 of the control station 10 produces a monitor/control signal to the satellite earth stations $20_2$ and $20_3$ installed in the opposite zone Y before the actual operation is commenced, and supplies this monitor/control signal to the transmission data detecting unit 182 employed within the control station 10 (step 47). Upon entry of a detecting signal for the monitor/control signal derived from the transmission data detecting unit 182, the controlling unit 181 controls the delayed data generating unit 184 to again generate such delayed data having no delay, and transmits this delayed data as a CSC signal A1 (CSC01) from the antenna 11 through the multiplier 132, the CSC modulating unit 131, the combiner 121, the U/C 122, and the HPA 123 (step 48).

The CSC signal A1 transmitted from the control station 10 is received through the satellite by the satellite earth station $20_2$ and the repeater station 30 installed in zone Y located opposite to zone X. The satellite earth station $20_2$ supplies this received signal to the SDC 237, so as to perform the data confirmation after the received signal is demodulated via the outdoor unit 22, and the distributor 234 within the indoor unit 23, to the CSC demodulating unit 236. Upon reception of the confirmation result such that the delayed data having no delay is confirmed by this SDC 237, the controlling unit 238 sets the delay time of the delay device 239 to zero. The satellite earth station $20_2$ transmits the output data of the internal SDC 237 as another CSC signal B2 through this delay device 239, the CSC modulating unit 231, the combiner 233, the U/C 221, and the HPA 222 from the antenna 21 (step 49).

This CSC signal B2 transmitted from the satellite earth station $20_2$ is received via the satellite by the control station 10, and then is received by the reception data detecting unit 183 through the LNA 124, the D/C 125, the distributor 126, the CSC demodulating unit 141, and the de-multiplier 142, respectively. The controlling unit 181 measures a time duration (T2) after the control station 10 has transmitted the CSC signal A1 until the responding CSC signal B2 corresponding to this CSC signal A1 is received, based on the respective data derived from the transmission data detecting unit 182 and the reception data detecting unit 183. The the measured time duration is stored in a memory employed in the controlling unit 181 (step 50).

Next, the controlling unit 181 employed in the control station 10 calculates a time difference (ΔT) between the first response time (T1) which is stored in the memory at the step 46, which is required to communicate between itself and the satellite earth station $20_1$ via the satellite and the repeater station 30, and the second response time (T2) which is stored in the memory at the step 50, which is required to communicate between itself and the satellite earth station $20_2$.

When this time difference is a large value, there are some possibilities that the response signals may collide with each other and normal communication cannot be executed. Accordingly, the control station 10 causes the delayed data generating unit 184 to generate delay data for delaying the response time to the satellite earth station $20_2$ installed in zone Y, in response to a delay data control signal produced which is based upon the calculated time difference (ΔT). This delay data is transmitted as the CSC signal A1 from the antenna 11 through the multiplier 132, the CSC modulating unit 131, and the RF unit 12 (step 51).

This CSC signal A1 is received via the satellite by the satellite earth station $20_2$ installed in zone Y, and is supplied via the outdoor unit 22 and the distributor 234 to the CSC demodulator 236. After the above-described delayed data has been demodulated by this CSC demodulator 236, the resultant data is supplied to the SDC 237. The SDC 237 sets the delay time (ΔT) of the delay device 239 based on this delayed data (step 52). As a result, a time duration (T2') during which the response signal B2 corresponding to the CSC signal A1 transmitted from the control station 10 has reached the control station 10 from the satellite earth station $20_2$ installed in the zone Y may be equal to the response time (the above-described first response time T1) from the satellite earth station $20_1$ installed in zone X.

After the delay time setting operation to the delay device 239 is accomplished, the satellite earth station $20_2$ produces a delay time setting operation end signal and transmits this end signal as the CSC signal B2 to the control station 10 (step 53). Upon receipt of the delay time setting operation end signal, the control station 10 completes the initial setting operation. In accordance with the initial setting operation with the above-explained arrangements and controls, the CSC signal can be sent even between the control station 10 and the satellite earth station $20_1$ installed in the same zone X.

Subsequently, the control station 10 performs a systems check. This systems check is periodically performed in order to acquire condition information about the respective satellite earth stations $20_1$ to $20_3$. This systems check is described below with reference to FIG. 10.

(2). Systems Check

First, the PDC 15 of the control station 10 produces demand data for acquiring condition information (namely, information as to whether or not communication is being made, or whether or not a failure happens to occur) about the satellite earth station $20_1$ installed in the same zone X as that of the control station 10 (step 55), and sends the CSC signal A1 toward the satellite earth station $20_1$ to be transmitted (step 56). This CSC signal A1 is received via the satellite by the repeater station 30, and converted into the CSC signal A2 in this repeater station in a similar manner to the above-described manner. Then the converted CSC signal A2 is returned to the zone X and received by the satellite earth station $20_1$ (step 57).

The satellite earth station $20_1$ receives/demodulates this demand data, so that various sorts of condition information about itself is transmitted while producing the CSC signal B1 during the frame timing allocated to itself (step 58). This CSC signal B1 is received via the satellite by the repeater station 30, and is converted into the CSC signal B2 therein, and then this CSC signal B2 is again returned to zone X, thereby being received by the control station 10 (step 59).

The control station 10 receives/demodulates this CSC signal B2, so that condition information about the satellite earth station $20_1$ is acquired. Subsequently, the PDC 15 of the control station 10 produces demand data for acquiring condition information about the satellite earth station $20_2$ installed in zone Y, which is located opposite to that of the control station 10 (step 60), and produces the CSC signal A1 during the frame timing toward the satellite earth station $20_2$, which will then be transmitted (step 61). The satellite earth station $20_2$ receives/demodulates this CSC signal A1 which has been received via the satellite, so that condition information about the itself is transmitted while the CSC signal B2 is produced during the frame timing allocated to it (step 62).

This CSC signal B2 is received via the satellite by the control station 10 to be demodulated therein, so that the condition information of the satellite earth station $20_2$ is acquired by the control station 10. It should be noted that due to the above-described initial setting operation, the time T1 defined as after the PDC 15 has sent out the demand data for acquiring the condition information of the satellite earth station $20_1$ which is installed in the same zone X, until the PDC receives the response signal, is equal to the time T2' defined as after the PDC 15 has transmitted the demand data for acquiring the condition information about the satellite earth station $20_2$, which is installed in the opposite zone Y, until the PDC receives the response signal.

(3). Communication

Next, in response to an instruction issued from the control station 10, the demand assignment multiple access (DAMA) system communication can be established. First, a description follows of a case where a satellite communication is established between the satellite earth station $20_1$ and the satellite earth station $20_2$, which are installed in different zones with reference to FIG. 11. For instance, when the satellite earth station $20_1$ corresponds to a call issuing station, the satellite earth station $20_1$ enters a dialing number for specifying the satellite earth station $20_2$, and a call request is transmitted using the CSC signal B1 (step 65). As previously described, this CSC signal B1 is received via the satellite by the repeater station 30. The CSC signal B1 is converted into the CSC signal B2 in repeater station 30, which will then be returned to zone X to be received by the control station 10 (step 66).

The PDC 15 in the control station 10 produces a channel setting signal (CHANNEL SET) for designating the non-used communication channel among a plurality of communication channels (step 67), and transmits this channel setting signal as the CSC signal A1 (step 68). This CSC signal A1 is received through the satellite by the respective satellite earth stations within zone Y. In response to this received/demodulated channel setting signal, the satellite earth station $20_2$ sets the carrier channel and the demodulating signal channel of the communication modulating unit 232 and the communication demodulating unit 235, based on the communication channel designated by the control unit 238 within the indoor unit 23 (step 69).

When the repeater station 30 in zone Y receives the above-described CSC signal A1, the repeater station 30 converts this CSC signal A1 into CSC signal A2, which will then be transmitted to the satellite earth station $20_1$ (step 70). The satellite earth station $20_1$ receives/demodulates this CSC signal A2 to obtain the channel setting signal, and in response to this channel setting signal, the carrier channel and the demodulating signal channel of the communication modulating unit 232 and the communication demodulating unit 235, respectively, are set based upon the communication channel designated by the controlling unit 238 employed in the indoor unit 23 (step 71). Thereafter, bi-directional telephone communication can be performed via the satellite by using the first non-used communication channel (e.g., C11 shown in FIG. 5) from the satellite earth station $20_1$ to the satellite earth station $20_2$, and by using the second non-used communication channel (e.g., C12 shown in FIG. 5) from the satellite earth station $20_2$ to the satellite earth station $20_1$.

Figure 12:
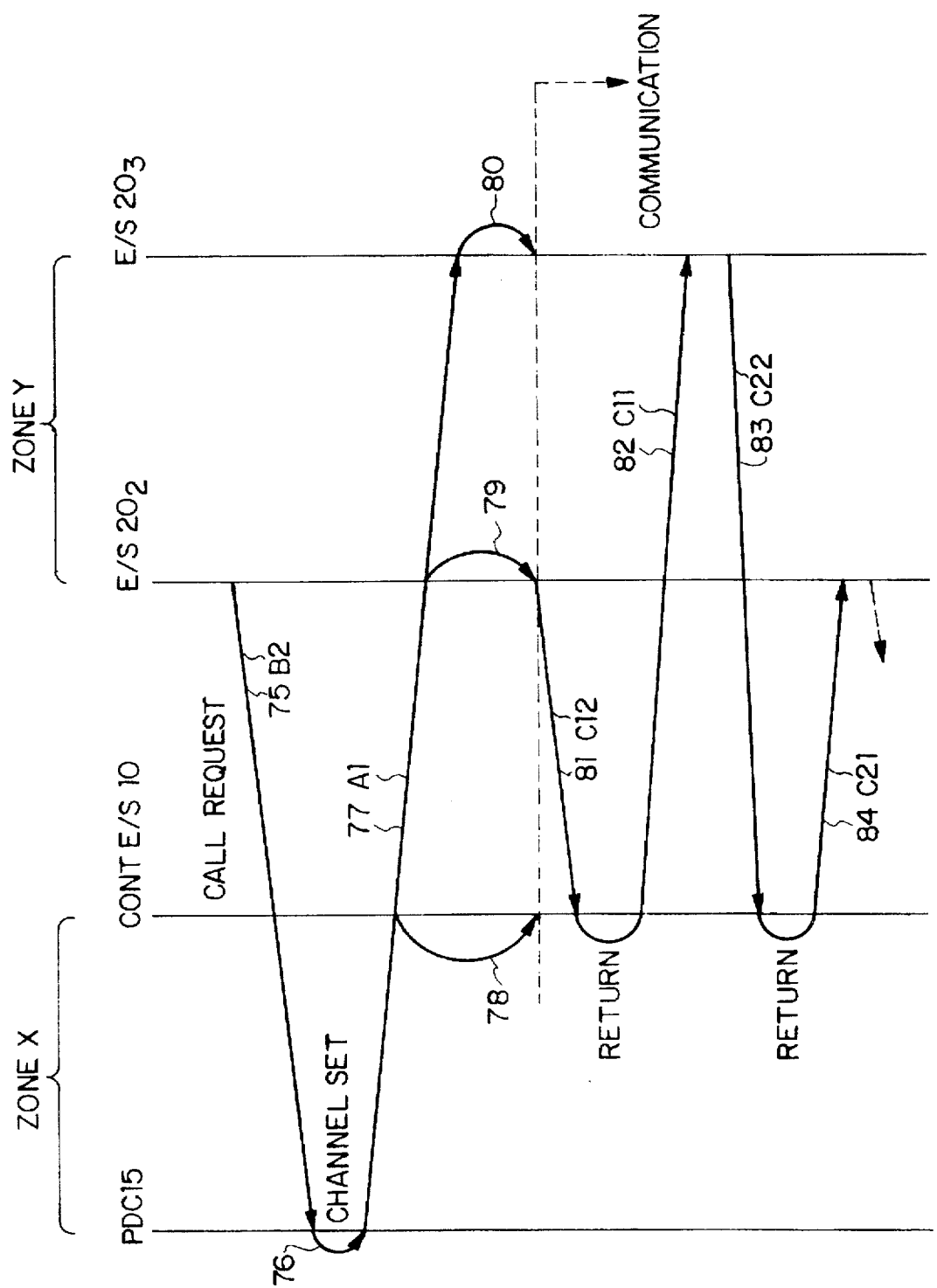
FIG. 12 represents a sequence diagram when a communication is established between the satellite earth stations installed in the same zone in the communication system of FIG. 5.

Subsequently, communication between the satellite earth stations $20_2$ and $20_3$, which are installed in the same zone Y, are described as follows with reference to FIG. 12. Assuming now that the satellite earth station $20_2$ corresponds to the call issuing station, this satellite earth station $20_2$ inputs a dialing number to the satellite earth station $20_3$, and transmits a call request using the CSC signal B2 (step 75). This CSC signal B2 is received via the satellite by the control station 10.

In response to the above-described call request which has been received/demodulated, the PDC 15 employed in the control station 10 produces a channel setting signal for designating the non-used communication channel among a plurality of communication channels (step 76). Then, the PDC 15 transmits this channel setting signal as the CSC signal A1 via the CSC modulator 13 and the RF unit 12 from the antenna 11 (step 77). The controlling unit 191 sets this channel setting signal to values corresponding to second and fourth communication channels, which designate the carrier channels of the communication signal modulating units 161 employed in two preselected communication signal modulators $16_n$ and $16_i$, and demodulating signal channels of the communication signal demodulating units 171, employed in two communication signal demodulators $17_n$ and $17_i$ (step 78).

The channel setting signal transmitted as the CSC signal A1 from the control station 10 is received via the satellite by the satellite earth stations $20_2$ and $20_3$, and both the carrier channel and the demodulating signal channel of the communication demodulating unit 232 and the communication demodulating unit 235 are set by the controlling unit 238 employed in the respective indoor units 23 based upon the first and third designated communication channels (steps 79 and 80).

As a result, thereafter communication can be established between the satellite earth stations $20_2$ and $20_3$. In other words, the satellite earth station $20_2$ transmits the telephone communication signal derived from the communication terminal equipment 24 by employing the first communication channel (for example, C12 of FIG. 5) allocated by the control station 10 (step 81). This telephone communication signal is received by the control station 10, and this control station 10 transmits this telephone communication signal through the communication signal demodulator $17_n$ and the communication signal demodulator $16_n$, by employing the second communication channel (for example, C11 of FIG. 5) (step 82).

The telephone communication signal which has been transmitted from the control station 10 in the second communication channel is received by the satellite earth station $20_3$. In response to this signal reception, the telephone communication signal generated from the communication terminal equipment 24 of the satellite earth station $20_3$ is transmitted from the satellite earth station $20_3$ by using the third communication channel (for instance, C22 of FIG. 5) allocated to this satellite earth station $20_3$ by the control station 10 (step 83).

This telephone communication signal is received by the control station 10, and the control station 10 transmits this telephone communication signal via the communication signal demodulator $17_i$ and the communication signal demodulator $16_i$ by using the fourth communication channel (for instance, C21 of FIG. 5) (step 84). The telephone communication signal transmitted from the control station 10 in the fourth communication channel is received by the satellite earth station $20_2$. Subsequently, the above-described operations are repeated, so that communication can be established between the satellite earth stations $20_2$ and $20_3$ which are installed in the same zone, and which communication could not be achieved in the conventional satellite communication systems.

Figure 13:
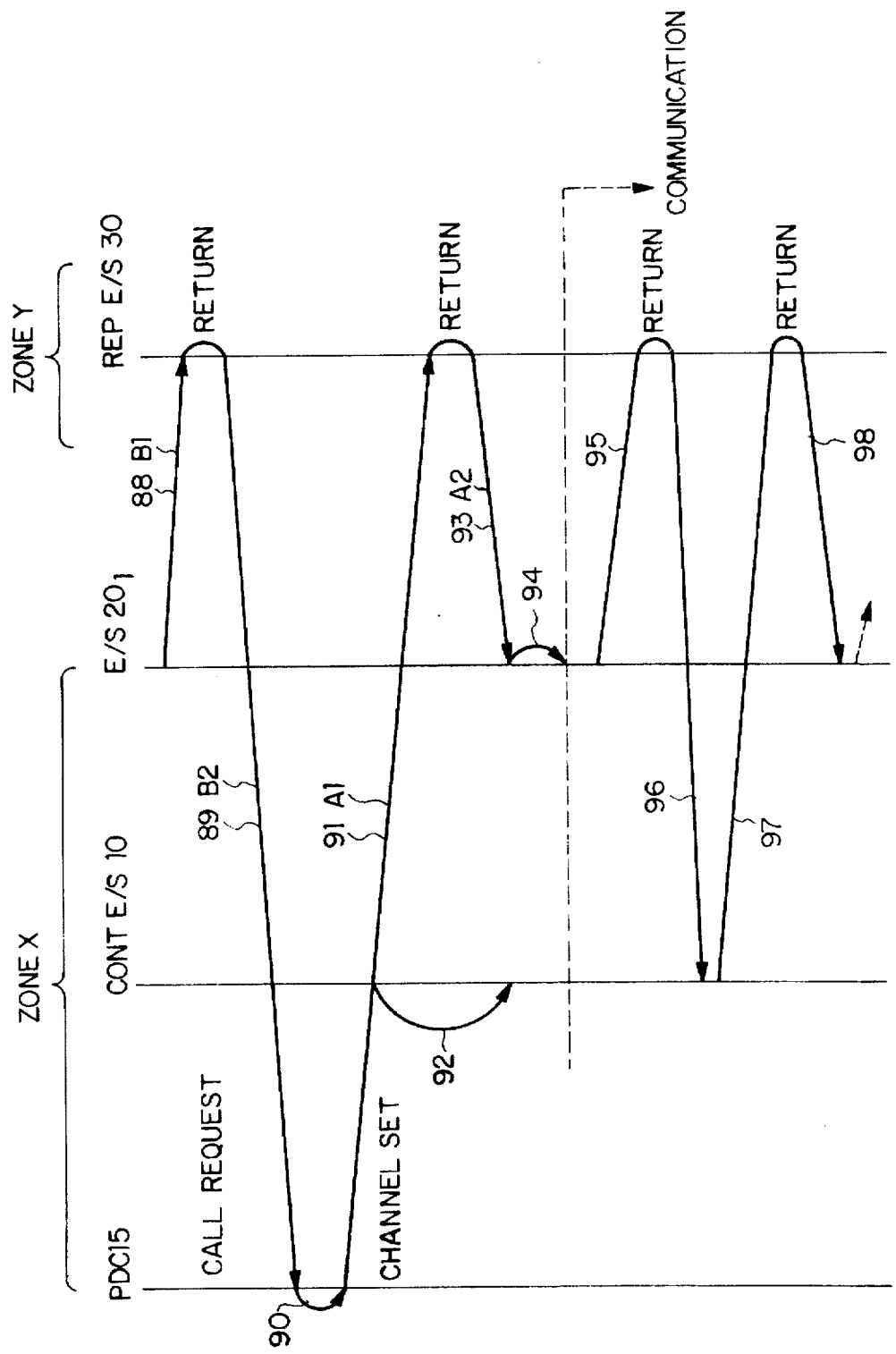
FIG. 13 shows a sequence diagram when a communication is established between the satellite earth stations installed in the same zone as that of the control station in the communication system of FIG. 5.

Next, another explanation will be made of a communication signal established between the control station 10 and the satellite earth station $20_1$ located in the same zone X as this control station 10, with reference to FIG. 13. Assuming now that the satellite earth station $20_1$ enters a dialing number to the control station 10 and issues a call request, this call request signal is transmitted from the satellite earth station $20_1$ using the CSC signal B1 (step 88). Then, the call request signal transmitted as this CSC signal B1 is received via the satellite by the repeater station 30, and is converted into the CSC signal B2 in this repeater station, and then the CSC signal B2 is returned to the control station 10 (step 89).

The control station 10 receives/demodulates the call request signal transmitted as the CSC signal B2, and the PDC 15 produces a channel setting signal used to designate the non-used communication channel among a plurality of communication channels (step 90), and transmits this channel setting signal as the CSC signal A1 (step 91). On the other hand, the controlling unit 191 sets both the carrier channel of the communication signal modulating unit 161 employed in the communication signal modulator $16_n$, and the demodulating signal channel of the communication signal demodulating unit 171 employed in the communication signal demodulator $17_n$, to values corresponding to each of the designated communication channels (step 92).

This channel setting signal transmitted as the CSC signal A1 is received via the satellite by the repeater station 30, is converted into the CSC signal A2 in repeater station 30, and then is transmitted to the satellite earth station $20_1$ (step 93). Based upon the received/demodulated channel setting signal, the satellite earth station $20_1$ sets the carrier channel and the demodulating signal channel of the communication demodulating unit 232 and the communication demodulating unit 235, by the controlling unit 238 in the indoor unit 23 (step 94).

As a consequence, thereafter, communication can be established between the control station 10 and the satellite earth station $20_1$. That is, the satellite earth station $20_1$ transmits the telephone communication signal derived from the communication terminal equipment 24 using the first communication channel allocated by the control station 10 (step 95). This telephone communication signal is transmitted from the repeater station 30 by using the second communication frequency (step 96), and then is received by the control station 10. In response to this signal, another telephone communication signal is produced by the control station 10, and is transmitted from the control station 10 by using the third communication channel allocated by the control station 10 (step 97).

This telephone communication signal is transmitted by the repeater station 30 using the fourth communication channel (step 98). The communication signal which is transmitted from the repeater station 30 by the fourth communication channel is received by the satellite earth station $20_1$. Then, the above-described operation is repeatedly performed, so that communication can be established between the control station 10 and the satellite earth station $20_1$, which are located in the same zone. Such a communication operation could not be realized in the conventional communication system.

It should be understood that since the present invention is not limited to the above-described embodiment; for example, only one of the control station 10 and repeater station 30 may have the above-described repeating function, whereas the other station may not have this repeating function.

As previously described, according to the present invention, the communication signal transmitted from one of the first and second satellite earth stations, which are installed in the zone opposite to the zone where the control station is located, to the other earth station, is returned by the control station to be received by the other satellite earth station. As a consequence, even when the multi-spot beam is used, communication can be established between the first and second satellite earth stations installed in the same zone.

Also, according to the present invention, since the CSC signal can be transmitted/received via the repeater station between the control station and the satellite earth station which are installed in the same zone as that of the control station, even when the multi-spot beam is employed, communication can be established between the control station and the satellite earth station which are located in the same zone.

According to the present invention, the communication between the two arbitrary stations among the control station, and the plural satellite earth stations, can be established by way of the demand assignment multiple access system irrelevant of the locating zone, even when the multi-spot beam is utilized. As a consequence, the multi-spot beam type satellite communication line can be effectively utilized.

What is claimed is:

1. A demand assignment multiple access (DAMA) type satellite communication system in which a CSC (common signalling channel) signal is transmitted/received via a satellite between a control station and a plurality of satellite earth stations by way of an SCPC (single channel per carrier) communication system using a cross beam among a plurality of zones covered by a multi-spot beam from a single antenna in which communication from one earth station to another in the same zone via satellite is prohibited, and in response to a demand issued from said satellite earth station, a communication signal channel is automatically allocated, wherein said DAMA type satellite communication system comprises:

first communication means for performing a communication by said DAMA system between a first satellite earth station installed in a first zone where said control station is installed among said plural zones, and a second satellite earth station of a plurality of second satellite earth stations installed in a second zone located opposite to said first zone by returning said CSC signal at a repeater station of said second zone;

second communication means for performing a communication between two of said plurality of second satellite earth stations second satellite earth stations with each other, located within said second zone by returning said CSC signal at a repeater station of said second zone; and third communication means for performing a communication between said control station and said first satellite earth station, located within said first zone.

2. A DAMA type satellite communication system as claimed in claim 1 wherein:

said satellite earth station comprises:
   transmitting/receiving means for transmitting/receiving said CSC signal and said communication signal;
   modulating/demodulating means for modulating/demodulating said CSC signal;
   modulating/demodulating means for modulating/demodulating said communication signal;

control means for controlling a communication channel of said communication signal modulating/demodulating means based on the data of said CSC signal; and a delay device for delaying a return time of transmission data of said CSC signal based on reception data of said CSC signal during an initial setting operation.

3. A DAMA type satellite communication system as claimed in claim 1 wherein:

said control station comprises:
transmitting/receiving means for transmitting/receiving said CSC signal and said communication signal;

modulating/demodulating means for modulating/demodulating said CSC signal and said communication signal;

returning means for said communication signal for returning a modulated/demodulated communication signal delivered from said modulating/demodulating means;

a PDC (primary DAMA controller) for inputting therein an output signal from said CSC signal modulating/demodulating means and for performing said DAMA control operation to output CSC data;

delay time measuring means for measuring delay time on the basis of a time difference between transmission time of said CSC signal to said first and second satellite earth stations and reception time of said CSC signal from said first and second satellite earth stations;

delay time data transmission means for transmitting delay time data to said first and second satellite earth stations on the basis of said delay time measured by said delay time measuring means.

4. A demand assignment multiple access (DAMA) type satellite communication system in which a CSC (common signalling channel) signal is transmitted/received via a satellite between a control station and a plurality of satellite earth stations by way of an SCPC (single channel per carrier) communication system using a cross beam among a plurality of zones covered by a multi-spot beam from a single antenna in which communication from one earth station to another in the same zone via satellite is prohibited, and in response to a demand issued from said satellite earth station, a communication signal channel is automatically allocated, wherein said DAMA type satellite communication system comprises:

delay time compensating means for compensating delay times in such a manner that said delay times defined after said CSC signal is transmitted from said control station to a first satellite earth station of a plurality of second satellite earth stations installed in a first zone and a second satellite earth station installed in a second zone until said CSC signal is received from said first and second satellite earth stations to said control station are equal to each other;

in case of the CSC signal transmission/reception between said first satellite earth station within said first zone and said second satellite earth station within said second zone, means for returning a call request signal by said CSC signal transmitted from said first satellite earth station to said control station within said first zone and communication channel setting signal from said control station to said first satellite earth station at a repeater station having a repeater function, located in said second zone;

in case of the CSC signal transmission/reception between two of said second satellite earth stations of a plurality of second satellite earth stations located in said second zone, means for returning communication signal at said control station after defining said communication channel by a PDC (primary DAMA controller) of said control station; and in case of the CSC signal transmission/reception between the control station and the satellite station, which are located within said first zone, means for returning at said repeater station located in the second zone, the call request signal by said CSC signal derived from said first satellite earth station within said first zone, said communication channel setting signal by said CSC signal derived from said control station, and said communication signal between the control station and the satellite earth station, located in said first zone.

5. A DAMA type satellite communication system as claimed in claim 4 wherein:

in an initial setting operation for said satellite earth station by said control station, said delay time compensating means;

transmits a monitor/control signal for said satellite earth station within said first zone to said repeater station located within said second zone;

measures a delay time (T1) defined after said satellite earth station receives a return signal of said monitor/control signal until said monitor/control signal is returned at said repeater station to be received;

measures another delay time (T2) defined after said monitor/control signal is transmitted to the satellite earth station in said second zone until a return signal of this monitor/control signal is received; and controls the delay device employed in said satellite earth station so as to reduce a difference between said delay times T1 and T2 by transmitting delay data to said satellite earth station.

6. A DAMA type satellite communication system as claimed in claim 4 wherein said repeater station comprises:

a receiving unit for receiving said CSC signal;

a distributor for distributing said received CSC signal in order that a plurality of CSC signals can be received;

a CSC demodulator for demodulating said plurality of CSC signals distributed by said distributor;

a plurality of CSC modulators for modulating an output signal from said CSC demodulator by returning said output signal;

a combiner for combining output signals from said plural CSC modulators with each other; and a transmitting unit for transmitting an output signal derived from said combiner.

7. A DAMA type satellite communication system as claimed in claim 4 wherein:

said satellite earth station comprises:
transmitting/receiving means for transmitting/receiving said CSC signal and said communication signal;

modulating/demodulating means for modulating/demodulating said CSC signal;

modulating/demodulating means for modulating/demodulating said communication signal; and a delay device for controlling a communication channel of said communication signal modulating/demodulating means based on the data of said CSC signal transmitted from said control station, and for delaying a time defined after said CSC signal is received until a response signal is transmitted based upon received delay data of said CSC signal.

8. A DAMA type satellite communication system as claimed in claim 4 wherein:

said control station comprises:

transmitting/receiving means for transmitting/receiving said CSC signal and said communication signal;

modulating/demodulating means for modulating/demodulating said CSC signal and said communication signal;

returning means for said communication signal for returning said communication signal to return said modulated/demodulated communication signal by said modulating/demodulating means;

a PDC (primary DAMA controller) for inputting therein an output signal from said CSC signal modulating/demodulating means and for performing said DAMA control operation to output CSC data;

delay time measuring means for measuring delay time on the basis of a time difference between transmission time of said CSC signal to said first and second satellite earth stations and reception time of said CSC signal from said first and second satellite earth station; and delay time data transmission means for transmitting delay time data to said first and second satellite earth station on the basis of said delay time measured by said delay time measuring means.

* * * * *